United States Patent [19]

Provó Kluit et al.

[11] Patent Number: 5,733,488
[45] Date of Patent: Mar. 31, 1998

[54] METHOD OF MAKING A FOAMABLE FILM

[75] Inventors: Pieter Willem Provó Kluit, The Hague; Adriaan Beukers, Heemstede, both of Netherlands

[73] Assignee: Tsutsunaka Plastic Industry Co., Ltd., Osaka, Japan

[21] Appl. No.: 669,707

[22] Filed: Jun. 24, 1996

[30] Foreign Application Priority Data

Jun. 23, 1995 [EP] European Pat. Off. .............. 95201710

[51] Int. Cl.$^6$ .............................. B29C 44/20; B29C 71/00
[52] U.S. Cl. ........................... 264/53; 264/45.3; 264/344
[58] Field of Search ............................ 264/41, 51, 53, 264/344, 45.3

[56] References Cited

U.S. PATENT DOCUMENTS

| 4,118,449 | 10/1978 | Rinde | 264/28 |
| 4,174,425 | 11/1979 | Saito et al. | 521/56 |
| 4,419,308 | 12/1983 | Matsumura et al. | 264/344 |
| 4,438,222 | 3/1984 | Nakagawa et al. | 521/60 |
| 5,185,111 | 2/1993 | Lazar | 264/344 |

FOREIGN PATENT DOCUMENTS

| 61-287944 | 12/1986 | Japan | 264/344 |
| 2168981 | 7/1986 | United Kingdom | 264/344 |

*Primary Examiner*—Allen R. Kuhns
*Attorney, Agent, or Firm*—Armstrong, Westerman, Hattori, Mcleland & Naughton

[57] ABSTRACT

The present invention is directed to a method of making a foamable film of at least one thermoplastic resin with at least one liquid blowing agent incorporated therein, said method comprising forming the thermoplastic resin and a liquid swelling agent for the thermoplastic resin into a layer, contacting the said layer with the liquid blowing agent and replacing at least part of the swelling agent in the resin by the liquid blowing agent.

8 Claims, No Drawings

METHOD OF MAKING A FOAMABLE FILM

This invention relates to a method of making a foamable film of at least one thermoplastic resin with at least one liquid blowing agent incorporated therein.

Such a method is known inter alia from European patent application 345,855. A method of bonding materials using a film impregnated with a solvent is also described in European patent application 274,789.

The film described in the first-mentioned patent application has a number of uses, including bonding materials to each other with foaming. Another use of such a film is the manufacture of sandwich materials, for example as described in European patent applications 264,495 and 268,148.

Such materials are entirely thermoplastic and consist of a core material which comprises a thermoplastic foam and two top layers consisting of a fibre-reinforced synthetic material such as polycarbonate or polyetherimide.

A foamable film as described in European patent application 345,855 can be used well for the manufacture of such sandwich materials, by providing the film in unfoamed form between two reinforced top layers and then heating the assembly, so that the film foams and a sandwich material is formed.

In European patent application 345,855 a number of methods are given for manufacturing such a film, such as 'solvent casting'. The methods described amount to either removing the solvent ($=$ blowing agent) only partly from the synthetic material or afterwards incorporating an amount of blowing agent in the synthetic material.

In the practice of methods wherein the film is made starting from a solution or dispersion of the synthetic material in a solvent or softening agent for the synthetic material, a number of problems may occur. It has been found that for a number of thermoplastic resins it is very difficult or even impossible to find a blowing agent that can be incorporated in the film by the existing methods, such as solvent casting, vapour impregnating, or swelling. Also there are a number of resins wherein a blowing agent can be incorporated, but where the only possible blowing agents are environmentally less suitable, requiring either very laborious processing methods or long drying after the production of the materials. Also some of the blowing agents may be toxic and/or inflammable, which makes them less suitable for use on a commercial scale.

It is an object of the invention to provide a method for preparing a foamable film, having incorporated therein a liquid blowing agent, which method makes it possible to use a wide variety of blowing agents.

The method of the present invention is based thereon, that first a film of a thermoplastic resin is prepared, in which film a liquid swelling agent is incorporated, which swelling agent is subsequently replaced by the blowing agent.

Accordingly the method of the invention comprises forming the thermoplastic resin and a liquid swelling agent for the thermoplastic resin into a layer, contacting the said layer with the liquid blowing agent and replacing at least part of the swelling agent in the resin by the liquid blowing agent.

Replacing the swelling agent by the blowing agent can surprisingly easily be accomplished by simply contacting the swelled film with the liquid blowing agent, as a result of which an diffusion equilibrium is obtained between the swelling agent and the blowing agent. As the blowing agent is present in a large excess, the swelling agent is substantially expelled from the film and replaced by the blowing agent. It is an advantage if the swelling agent and the blowing agent are miscible, at least under the conditions of treatment, and in the relative amounts involved.

The selection of blowing and swelling agents depends on the type of thermoplastic resin that is used, and the requirements on the final product. As swelling agents generally solvents for the thermoplastic resin may be used, whereas the blowing agent often will not have a good dissolving capacity for the resin.

Suitable swelling agents are, among others acetone, mono-, di-, and trichloromethane, hydrocarbons, such as butane, pentane, hexane, n-decane and the like, including the various isomers thereof, cyclic aromatic and aliphatic hydrocarbons, and the like. The blowing agents are preferably less toxic and/or less flammable and may be selected from the same group, but it is also possible to use products like water and ethanol. It is also possible to use a solution of a chemical blowing agent in water or another solvent to replace the swelling agent. After removal of the liquid the chemical blowing agent will remain in the film. As indicated previously the actual selection of the agents and the resin is interrelated.

In principle, any thermoplastic resin may function as a synthetic base for the film to be used in the method according to the invention. The thermoplastic resin of the film is preferably selected from the group consisting of polyetherimide, polycarbonate, acrylate polymers, olefin polymers, styrene polymers, polyether sulfone, polyether ketone, polyether-ether ketone, polyphenylene oxide, polyphenylene sulfide, and mixtures of two or more of these synthetic materials. Any preference is to a large extent determined by the use the article is intended for. For use in fields where a high mechanical load of the materials may occur, or where strict requirements are set as to the fire-retardant properties of the materials, there is a preference for polyetherimide, polycarbonate, polyether sulfone, polyether ketone, polyether-ether ketone, and mixtures of two or more of these synthetic materials.

When polyetherimide is used as a thermoplastic resin, it is preferable to start from acetone as a swelling agent, because with this combination optimum swelling can be obtained. Subsequently it is possible to replace the swelling agent with, for example, water, by soaking the film in water.

According to another interesting embodiment, the thermoplastic resin is polypropylene, or a propylene copolymer. It is known that it is very difficult to make proper foams of polypropylene. The present invention, however, provides for a method to foam polypropylene using as ethanol as a blowing agent. In the first step of this process a film of polypropylene is swollen with cyclohexane. The swollen sheet is subsequently soaked in ethanol, resulting in a replacement of the cyclohexane by ethanol. The ethanol is an excellent blowing agent for polypropylene, however, up to now it was not possible to incorporate ethanol in polypropylene in useful amounts, such as up to 12 wt. %.

According to the simplest embodiment of the invention, the film consists of two components, namely the resin and the blowing agent. It is possible, however, that additives are incorporated in the film. Examples of such additives are selected inter alia from the group of existing stabilizers, antioxidants, fillers such as fibres and/or liquid crystalline polymers, pigments, flame-retardant additives, other inert additives and mixtures of two or more of the components. Further, a softening agent may be incorporated in the system, the purpose of the softening agent being to lower the temperature at which foaming occurs.

Suitable softeners include the fatty acids and metallic soaps thereof. APP, polybutylene, bitumen, or extender oil such as naphthalenic and paraffinic oil can also be used. For this purpose, it is also possible to use waxes, such as microcrystalline waxes.

The film according to the invention can be produced in different ways. According to a first method, the starting product is an already existing, extruded or moulded film, which is then provided with a liquid swelling agent by impregnation of the film with the liquid or through exposure to the vapour thereof. Since this method is rather laborious, it is not preferred. It is also possible to produce a film by extruding or otherwise shaping a mixture of the thermoplastic resin, the swelling agent and any other components that may be present. According to a third method the film can be produced by the method of 'solvent-casting', wherein a solution of the thermoplastic resin is formed into a film.

The blowing agent content in the finished film may vary within wide limits. The lower limit is determined by the fact that proper bonding requires a certain degree of foaming. Naturally, this is dependent on the specific combination of materials, but a suitable lower limit is a proportion of at least 0.5% by weight of blowing agent, calculated on the weight of the thermoplastic resin and the blowing agent together. Typical content rates range between 1 and 50% by weight. The upper limit is mainly determined by the fact that the film must still permit handling and must not be too weak.

After manufacture of the film, if so desired, it is cut to size and processed further or stored. When volatile blowing agents are used, it is preferably to provide the film with a protective film of a different material, which is preferably hardly permeable, if at all, to the blowing agent. Suitable materials for that purpose are the known barrier materials such as EVA and co-extruded multi-layer films, for example provided with at least one layer of a polyamide.

The film obtained using the method according to the invention can be employed for the same uses as set forth in European patent application 345,855. Examples of such uses are the so-called 'hot-melt adhesives', filler glues, but also the manufacture of sandwich materials as discussed hereinbefore.

The invention will now be illustrated in and by a non-limiting Example.

EXAMPLE 1

An 134 μm film of polyetherimide (Litrex (TM)) was swollen with acetone, resulting in an acetone equilibrium concentration of 20 wt. %. Immersion of one sample of the film in 1,1,1-trichloro-ethane resulted after a short period of time in an unfoamed film of a 1,1,1-trichloro-ethane content of 8.2% by weight, whereas immersion of a second sample in ethanol gave a PEI-film having an ethanol content of 17.2 wt. %.

EXAMPLE 2

The unfoamed films obtained according to example 1 were subsequently provided between two layers of a glass-fibre-reinforced polyetherimide. After heating in a mould a sandwich construction was obtained, built up from three layers and having the following properties.

|  | 1,1,1-trichlorethane | ethanol |
|---|---|---|
| Density: | 87.1 kg/m$^3$ | 87.1 kg/m$^3$ |
| Tensile strength | 1.5 MPa | 3.4 MPa |

EXAMPLE 3

An 135 μm film of polyetherimide (Litrex (TM)) was swollen with acetone, resulting in an acetone equilibrium concentration of 20 wt. %. Immersion of the film in water resulted after a short period of time in an unfoamed film of a liquid content of 8.5% by weight.

EXAMPLE 4

The unfoamed films obtained according to example 3 were subsequently provided between two layers of aluminium. After heating in a mould various sandwich constructions were obtained, built up from three layers, the foam having densities varying between 72 and 97 kg/cm$^3$.

We claim:

1. A method of making a heat-foamable thermoplastic film, said method consisting essentially of forming a film consisting of at least one thermoplastic resin and at least one swelling agent for the at least one thermoplastic resin, contacting said film with a liquid blowing agent and replacing at least part of the at least one swelling agent with the blowing agent, wherein the swelling agent is a hydrocarbon, or mono-, di-, or trichloromethane.

2. A method according to claim 1, wherein the liquid swelling agent and the liquid blowing agent are miscible with each other.

3. A method according to claim 1 or 2, wherein the liquid blowing agent is immiscible with the thermoplastic resin.

4. A method according to claim 1 or 2, wherein the thermoplastic resin is at least one resin selected from the group consisting of polyetherimide, polycarbonate, acrylate polymers, polyolefins, styrene polymers, polyether sulfone, polyphenylene sulfide, polyether ketone, polyether-ether ketone and polyphenyleneoxide resins.

5. A method according to claim 1 or 2, wherein the blowing agent is water, ethanol or 1,1,1-trichloroethane.

6. A method according to claims 1 or 2, wherein the heat-foamable thermoplastic film comprises 50–99% by weight of the thermoplastic resin 1–50% by weight of the blowing agent, and 0–15% by weight of one or more additives selected from the group consisting of stabilizers, antioxidants, fillers, pigments and flame-retardants.

7. A method according to claim 6, wherein the amount of the blowing agent in the heat-foamable thermoplastic resin is adequate to form a heat-foamed thermoplastic resin film having a pore volume of at least 10%.

8. A method according to claim 1 or 2, which comprises the additional step of heating the heat-foamable thermoplastic resin film to form a film of a foamed thermoplastic resin.

* * * * *